Dec. 30, 1941.                    D. K. EXL                    2,267,723
                    WOVEN ARTICLE AND METHOD OF MAKING SAME
                    Filed Feb. 12, 1938                 2 Sheets-Sheet 1

INVENTOR
Della K. Exl
BY Roy A. Plant
ATTORNEY

Dec. 30, 1941.  D. K. EXL  2,267,723
WOVEN ARTICLE AND METHOD OF MAKING SAME
Filed Feb. 12, 1938  2 Sheets-Sheet 2
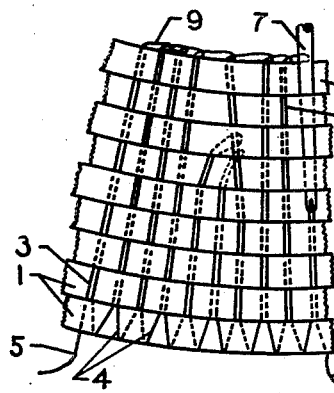
Fig. 3
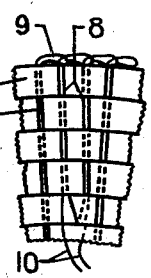
Fig. 4
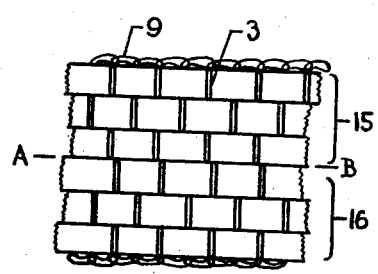
Fig. 5
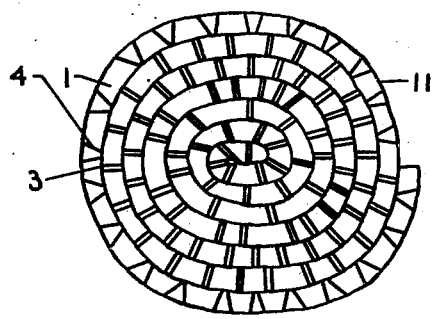
Fig. 6
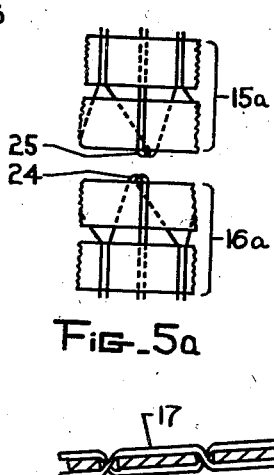
Fig. 5a
Fig. 7
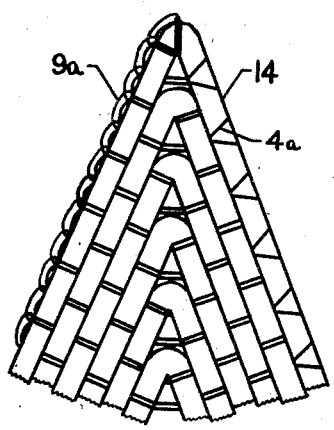
Fig. 9
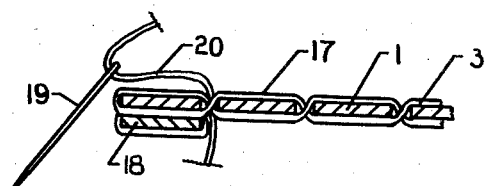
Fig. 8
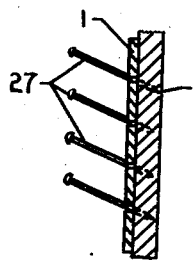
Fig. 10
INVENTOR
Della K. Exl
BY Roy A. Plant
ATTORNEY Patented Dec. 30, 1941

2,267,723

UNITED STATES PATENT OFFICE 2,267,723

WOVEN ARTICLE AND METHOD OF MAKING SAME

Della K. Exl, Battle Creek, Mich., assignor to Burnett W. Fish, Jackson, Mich.

Application February 12, 1938, Serial No. 190,209

13 Claims. (Cl. 2—192)

The present invention relates broadly to woven articles and the method of making same, and in its specific phases deals with hats and other articles which are made from strip material suitably assembled and held in shape by cross-weaving with yarn, or the equivalent.

Heretofore attempts have been made to make hats out of haircloth, felt, and similar material. The felt hats, for instance, are commonly formed from a single piece of felt which is steamed and pressed to form, the brim and crown of the hat being in one piece. These hats are inelastic, their shape is destroyed by folding, as well as by rain, and in hot weather they are uncomfortable due to lack of ventilating qualities. In general it may be said that the great bulk of women's hats require blocking, impregnation with sizing material, the use of wires, or the like, in order to get the desired shape, which it is difficult, if not impossible, to continuously retain in use.

Accordingly, among the objects of the present invention is the provision of a new type of hat, or other article, formed from strip material, such as felt, and cross-woven with yarn, thread, or the like.

Another object is to provide a hat, or other article, which is constructed to shape on a suitable form in manner such that wires, sizing, blocking, et cetera are unnecessary.

Another object is to provide a woven hat which is somewhat elastic, and particularly so at the head size, a thing which makes it stay on the head better.

Another object is to provide a woven hat which is relatively cool in summer use due to its self-ventilating qualities.

A further object is to provide a hat formed from strip material, cross-woven with yarn, the yarn acting as a hinge between strips in manner such that the hat may be folded without getting out of shape.

A further object is to provide a woven article utilizing a special weaving and joining of parts and which takes its shape from the form on which it is woven.

A still further object is to provide an article which is useful, economical of material, durable, and of pleasing appearance.

A still further object consists of the new methods of constructing the parts of the woven article and the ultimate assembly of same.

Still further objects and advantages will appear as the description proceeds.

To the accomplishment of the foregoing and related ends, the invention, then, consists of the steps, method, and product hereinafter fully described and particularly pointed out in the claims, the annexed drawings and the following description setting forth in detail several modes of carrying out the invention, such disclosed modes illustrating, however, but several of various ways in which the principle of the invention may be used.

Referring more particularly to the drawings:

Figure 3 shows the cross-weaving of a hat brim, or the like, and the picking up of short courses of cross-weaving yarn.

Figure 4 shows another method of inserting short yarn strands in a cross-weaving construction.

Figure 5 shows the unit joinder of two pieces of woven material along the line A—B.

Figure 5a shows in disengaged and spread-apart form the elements of a unit joinder of two panels at the encircling stitch edge of each.

Figure 6 shows a spiral panel of the type which may be used as the top crown of a hat.

Figure 7 is a sectional view showing the joining of the side crown to the brim of a hat.

Figure 8 is a sectional view showing the edge of the brim of a hat and the manner of reinforcing same.

Figure 9 shows an inverted V unit usable in multiple for forming the complete crown of a hat.

Figure 10 shows in diagrammatic manner the assembly and holding of felt strips on a suitable form of prescribed shape for the article to be woven.

Figures 2, 12:
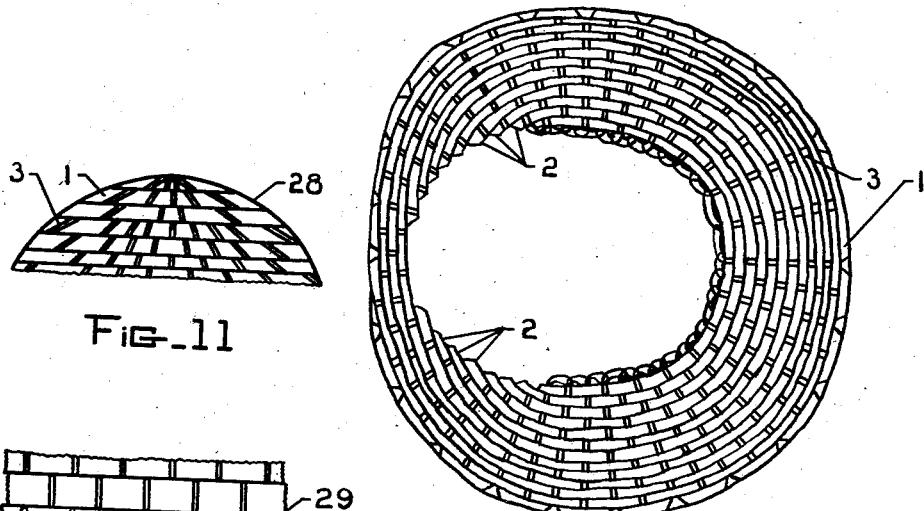
Figure 2 shows an off-center hat brim.
Figure 12 shows the appearance of an encircling stitch upper edge of a side crown, where same has been drawn together along the line C—D and closed with a whipping stitch.

In constructing a brim type hat, it will not only have a brim, but also a side crown, and, in some instances, a top crown. The brim may be of the same width all around, and in this case the simplest way to construct same is to spiral the strip of felt, or the like, until the desired width is attained, following which yarn, or the like, may be used to cross-weave same to shape. Many hats require the brim to be narrower at the back than at the front or sides. To form a brim with a narrow back, it may be made with a spiraling strip as before stated and then the inner opening elongated at one end by cutting away a portion of the spiral member in manner such that one or more of the inner courses will have a horseshoe or open end shape. One such construction is shown in Figure 2 wherein the felt strips 1 are cut away at one end 2 of the inner circumference to form the off-center brim, the cross-weaving 3 being utilized to hold the felt strips in place in final construction. Instead of cutting away one side of the inner circumference of the brim to give the off-center effect, the inner courses of the felt strips 1 may be cut horseshoe shape at the very beginning and laid in place until the desired size opening has been attained, following which the remainder of the felt strip 1 may be laid in spiral pattern to complete the brim. The hat brim shown in Figure 2 is also illustrative of this construction. Other variations of this same off-center principle may be utilized, it being obvious, for instance, that by duplicating the off-center feature at the opposite inner edge of the brim, an off-center brim with two narrow edges would result. Construction of the brim or side crown in this manner produces an endless unit in the direction of the length of the strip material used in forming same.

The cross-weaving may be accomplished in the following manner: Referring to Figure 3, it will be noted that at the lower edge of the panel shown, the yarn 5, from course to course of cross-weaving, encircles the lower felt strip 1, and for simplicity of understanding, this encircling construction will be referred to as an encircling stitch 4. The upper edge of the panel instead of having a series of encircling stitches 4 is provided with a series of chain stitches 9. The formation of this chain stitch 9 is accomplished as follows: With the felt strips 1 suitably held in place, the yarn 5 is started from spool 6 and a loop is made in same. Hook 7 is then passed between the abutting edges of the lower-most pair of felt strips 1 at the lower left corner of the panel and hooked onto the loop on the underside of the panel. The free end of the yarn 5 is held in place and the loop pulled up through between the abutting edges of the lower-most pair of felt strips 1. The hook is then disengaged and the point of same passed through the space between the abutting edges of the third and fourth strips of felt 1, passed under the third strip in a downward direction, and up between the abutting edges of the second and third strips. It is then hooked onto the pre-formed loop and same drawn upward across the top of the second felt strip and through under the third felt strip with the loop drawn out between the abutting edges of the third and fourth strips. This procedure is continued until the upper edge of the panel is reached and a loop left at that point. Where the panel is not too wide, the hook 7 may be interwoven from edge to edge of the panel in the same pattern that the yarn is to follow, then when the loop is placed on the hook and same drawn to the top of the panel, the cross-weaving of that course will be complete. The second course of cross-weaving yarn is started by forming another loop in the yarn 5 leading to the spool 6 and drawing such loop over the top of the lower-most strip of felt 1 and then interweaving it as before until the upper edge of the panel is reached. The loop of this second course is passed through the loop of the first course to form a chain stitch therewith. This alternating cross-weaving, which results in double strand cross stitches 3 laid in a basket weave pattern having an encircling stitch edge and a chain stitch edge, is continued until the complete panel is formed. While the cross-weaving may be accomplished with thread, cord, and the like, wool yarn is exceptionally well suited for use in connection with felt strips for hat construction due to its elasticity and pliability.

In forming a panel such as is shown in Figure 3, same may be curved and of a considerable width and in this case the double strands of cross-weaving 3 may be too close together at the upper edge and too far apart at the lower edge. To overcome this, where the too widely spread stitches are at the encircling stitch edge, it is desirable to insert some short stitches starting at the encircling stitch edge of the panel. As shown in Figure 3, the formation of the short stitches may be accomplished by cross-weaving as explained before except that the loops of the cross stitches are only carried part way up the panel. Two such short cross stitches are made and then the loops of same are picked up on the underside of the panel by the next cross stitch that goes completely across the panel and joins the chain stitch at that edge. The use of two short courses of cross stitches and then picking same up, as shown, results in the retention of the basket weave appearance, and at the same time makes the next full length cross stitch follow the desired order of predetermined over and under pattern from the top of the short stitches to the upper edge of the panel. Cross-weaving in this manner, it is to be noted, produces double cross-weaving yarn strands 3 which not only follow the regular over and under pattern from strip to strip, but so far as any individual felt strip 1 is concerned, the double cross-weaving yarn 3 from course to course will alternate from over to under and then over again on that strip.

In Figure 4 is shown a construction involving the use of short inserted cross stitches 8. Where such an insertion is to be made on the chain stitch edge 9 of the panel, instead of having a continuous yarn as shown in Figure 3, this construction requires the insertion of a separate piece of yarn 10. As shown in Figure 4 with the course of cross-weaving 3 at the left edge thereof in place and with its loop end on the chain stitch edge 9, the inserted stitch 8 is formed as follows: First it is decided how many courses of the felt strips 1 are to be covered by the short stitches 8. The piece of yarn 10 is then formed with a loop and same interwoven, as shown, from the predetermined starting point to the outer edge of the panel and the loop pulled through the last loop on the chain stitch edge. This short course is woven so that its over and under pattern will be the inverse of the previous course. Another short double course laid in inverse pattern to the previous short course is then pulled into place as before, in alternating manner to the upper edge of the panel and this loop threaded through the loop of the prior laid short course on the chain stitch edge 9. The next inverse laid course of cross-weaving will be the full width of the panel and the loop at its upper end in turn will pass through the loop of the last short cross-stitch course at that edge of the panel, thus continuing the chain. The insertion of the two short cross-stitches in this manner, it is to be noted, leaves two free ends as shown. The upper of these free ends is then pushed through between the felt strips 1 at the lower end of the short course and the two free ends then knotted together at the underside of the panel to fasten same in place. This type of construction again preserves the basket weave pattern and permits more stitches to appear on the chain stitch edge of the panel than appear at the encircling stitch edge thereof.

Where the hat is made with a brim, side crown, and top crown, the top crown may be constructed in various ways. For instance, as shown in Figure 6, it may be formed by spiraling a strip of felt, or the like, and then cross-weaving in manner previously described. The cross-weaving, for instance, may be accomplished by having the chain stitches at the center of the spiral panel 11 and the encircling stitches at the outer edge. Short cross-weaving stitches of the type shown in Figure 3 are preferably used at intervals in the cross-weaving of the flat spiral panel 11, to prevent too wide a spreading of the cross-weaving stitches at the outer or encircling stitch edge of the panel with corresponding crowding of the stitches at the center of the panel.

Figure 1:
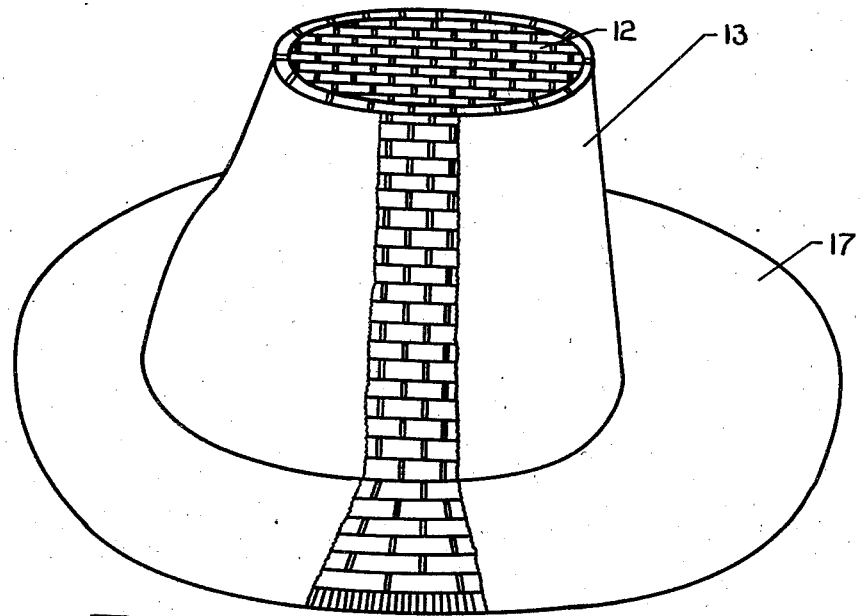
Figure 1 shows a partially detailed assembly view of one form of the invention.

Instead of using a spiral panel 11, as shown in Figure 6, the top crown may be made from strips with parallel cross-weaving, as shown in Figure 1. With this construction short felt strips are placed on a suitable pad and then cross woven to give top panel 12 the desired basket weave appearance.

The side crown 13 (Figure 1) may be constructed in various ways. For instance, the felt strips may be wound in spiral pattern around a suitably shaped form and then cross-woven with yarn in the manner described in connection with Figures 3 and 4. The side crown 13 may be constructed with the chain stitch at the bottom and encircling stitch at the top, or vice versa, and if the insertion of some short cross-weaving stitches is desired, the particular type used will depend upon which edge of the side crown is the larger. If the encircling stitch edge is the larger, then the type of short cross-weaving stitches shown in Figure 3 will be used. On the other hand, if the chain stitch edge is the larger, then the short cross-weaving stitches of Figure 4 will be used.

The crown of the hat may be made with sectional pieces 14 woven as shown in Figure 9. In constructing these pieces, a predetermined number of concentrically laid inverted V strips of felt, or the like, are laid in place and then cross-woven in manner providing an encircling stitch 4a on one edge and a chain stitch 9a on the other. By joining a number of these inverted V panels together by unit weaving, whipping, or the like, a complete crown may be formed.

The various parts of the hat may be woven together in unit manner. For instance, as shown in Figure 5, a cross-woven strip 15 may be joined along the line A—B to a cross-woven strip 16 at the encircling stitch edges of each. In this unit construction one of the cross-woven strips is made and then the other strip woven and its encircling stitch drawn as formed through the encircling stitch of the previously woven section and the weaving continued. The cross-weaving yarn of the two sections in this manner of weaving is interlocked at the point of joinder and the upper surface of the resultant panel has the appearance shown in Figure 5. The term "panel" used throughout the specification is intended to cover any of the elements which may be woven in accordance with the present invention.

Figure 11:
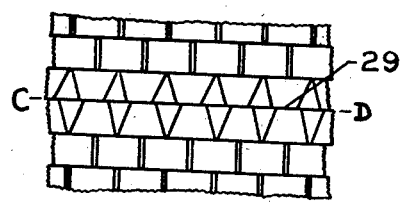
Figure 11 shows the continuous weaving of the side crown until it closes at the top.

For clarity of understanding the interweaving and interlocking of two encircling stitch edges, such as shown in Figure 5, an enlarged section with the stitches spread apart and not interlocked has been shown in Figure 5a. Referring to the latter, panel 16a, for instance, may be woven first and then panel 15a woven and unit joined as the weaving proceeds. In the final woven product, the loop 24 of panel 16a will be interwoven through loop 25 of the panel 15a. These two loops for purposes of clarity are illustrated in the disengaged position so that the pattern in which the yarn strands will ultimately lay can be seen, and also so that the path of the individual yarn strands to the adjacent courses can be readily followed.

Where the encircling stitch edge of a strip is to be joined to a chain stitch edge of a second strip, a top view of the resultant panel at the point of joinder will have the same appearance as shown along the line A—B of Figure 5. There are two distinct ways of joining the encircling stitch edge to a chain stitch edge. In the first place, this may be done by cross-weaving a strip to form a chain stitch edge to be joined to another strip during the weaving of the latter with an adjacent encircling stitch edge. In weaving the latter, the upper double stitch of the encircling stitch edge of the strip is looped around the upper double stitch of the chain stitch edge of the previously woven strip just above the chain loops, the under pairs of stitches of the encircling stitch edge of the strip in this construction are not drawn together and connected in that form to the chain stitch on the edge of the adjacent strip. The second procedure not only has the upper courses of the encircling stitch edge join the like courses of the chain stitch edge just above the chain loops as described above, but also has the under courses of stitches of the encircling stitch edge drawn together and made to join the corresponding under courses of the chain stitch edge just above the chain loops. This procedure anchors each course of one strip to the corresponding course of the other strip. This double anchoring system makes an extra strong joint, and where it is used at the point of joinder of the brim to the side crown, results in a very elastic head size which is exceptionally desirable for holding the hat on the head of the wearer. These types of joinder may be used not only at the point of joining the side crown to the brim, but also where the top crown is joined to the side crown, and wherever one of such members is constructed in two or more abutting parts, as illustrated in Figure 5. The brim 17 may be made with either a chain stitch or an encircling stitch outer edge, although a neater appearing edge is generally produced by an encircling stitch.

Where it is desired to have the brim reinforced at the outer edge, this may be accomplished by placing a strip of felt over or under the outer course of the brim and when whipping same in place by means of a needle and yarn or the like. A simple way of attaining this end is to turn under the outer course 18 of the brim and then by means of a needle 19 and yarn 20 whip same into place. The showing in Figure 8 is intended to be diagrammatic of these various ways of reinforcing the outer edge of the brim 17.

Where the brim and side crown are made separately, and then joined, this joining may be accomplished in various ways. For instance, where the abutting edges of the side crown 21 and brim 17 have chain stitches, a needle 22 with yarn 23 may be used to whip the two chain stitches together. The same procedure may be followed where an encircling stitch and a chain stitch come together and also where two encircling stitches come together, although the most elastic head size is obtained where two chain stitches are joined in this manner. Where the side crown has more stitches at its edge than the edge of the brim to be joined, or vice versa, then at intervals in unit joining or otherwise fastening the side crown to the brim, the excess stitches may be picked up by the cross stitches of the member having the lesser number of stitches, to make a smooth joint. The construction shown in Figure 7 may be considered as diagrammatic of any of these forms of construction.

Where the hat is provided with a top crown, this may be whipped into place as is shown in Figure 1 in connection with a rectangular basket weave top crown member 12. Where a spiral top crown panel 11, as shown in Figure 6, is used, then this may be whipped in place or may be unit woven in place as has been heretofore described in connection with the unit weaving of the brim to the side crown.

Where it is desired to form a hat without a separate top crown, this may be accomplished in various ways, for instance by weaving the side crown with a large number of inserted short stitches and continuing the weaving with the gathering up of short stitches, as heretofore described, until the top is completely closed. Under such conditions the loop ends of a pair of short shots may be chain stitched to another cross-weaving double yarn strand and it in turn, together with another cross-weaving double yarn strand chain stitched to still another cross-weaving double yarn strand which may pass to the smaller edge of the side crown and form one of the chain stitches there, or even become another chain stitch in the side crown intermediate of its encircling stitch and chain stitch edges. Thus there are more double yarn strands at the encircling stitch edge of the side crown than at the chain stitch edge thereof, the double yarn strands not reaching the chain stitch edge being chain stitched to other cross-weaving double yarn strands intermediate of the edges of the side crown. This type of construction is also equally applicable to brims and the like made according to the present invention. The construction shown in Figure 11 is diagrammatic of a side crown 28 which has been continuously woven until it closed at the top, and Figure 6 in general shows how the construction illustrated in Figure 11 would appear in top view if same were flattened. Instead of weaving the top of the side crown until it closes, the upper edge 29 (Figure 12) of the side crown may be brought together along the line C—D and the encircling stitches whipped together along the edge with a needle and yarn to close the opening.

In constructing the various parts of the article to be formed, such as a brim, side crown, top crown, or the like, it is preferable to make the individual part or article on a form of suitable shape. If the part is to be perfectly flat, then it may be made on a flat pad. On the other hand, it may be dished, as is common practice with hat brims, or may be substantially tubular, as is the case with a hat side crown. In constructing any of these parts, the felt strip material 1 is spiralled or otherwise laid on a suitable form 26 (Figure 10) and temporarily fastened in place, for instance, by means of rows of pins 27. With the felt strip material 1 held in place on the form 26, the cross-weaving, as heretofore described, may be carried on and courses of pins removed as the weaving progresses to their particular location. The illustration of pins as the holding means for the felt strips is to be considered as diagrammatic of the various equivalent ways that this may be accomplished.

Other modes of applying the principle of my invention may be employed instead of those explained, change being made as regards the product and method herein disclosed, provided the product, method, step or steps stated by any of the following claims or the equivalent thereof be employed.

I therefore particularly point out and distinctly claim as my invention:

1. In an article of the character described, the combination of a brim, and a side crown, the brim and side crown both being of endless unit construction formed from strip material laying edge to edge with double yarn strands joining same and forming a basket weave pattern therewith, the brim being provided with an encircling stitch outer edge and a chain stitch inner edge, said double yarn strands being of greater number at the encircling stitch edge of said brim than at the chain stitch edge thereof, the side crown being formed with an encircling stitch upper edge and a chain stitch lower edge, the side crown and brim being joined at the chain stitch edge of each by a whipping stitch.

2. In an article of the character described, the combination of a brim, and a side crown, the brim comprising strip material at least a part of which lies in spiral pattern, the side crown comprising strip material which lies in spiral pattern, the brim and side crown both utilizing double yarn strands which form a basket weave pattern with the strip material, the brim having an encircling stitch outer edge and a chain stitch inner edge, the double yarn strands at the encircling stitch edge of the brim being of greater number than at the chain stitch edge thereof, the side crown having a chain stitch upper edge and an encircling stitch lower edge, and a whipping stitch which joins the side crown and brim at the encircling stitch edge of the side crown and the chain stitch edge of the brim.

3. In a hat, the combination which comprises a brim formed from felt strip material at least part of which lies in spiral pattern, double yarn strands which cross-weave said felt strips of the brim in alternating manner so as to form a continuous basket weave pattern, said double yarn strands terminating in an encircling stitch at one edge of the brim and a chain stitch at the other edge, a felt strip lying in spiral pattern and in desired shape and size for a side crown, double yarn strands which cross-weave the spiral laying felt strip of the side crown, said double yarn strands laying in alternating manner over and under the spiral laying felt strip so as to form a basket weave pattern therewith with an encircling stitch at one edge of the side crown and a chain stitch at the other, the larger edge of said brim being provided at intervals with two substantially equal length short shots of double yarn strands which are part of the double yarn strands which cross-weave the brim, such short shots conforming with the basket weave pattern, said side crown also having at spaced intervals along its larger edge two substantially equal length short shots of double yarn strands which are part of the double yarn strands which cross-weave the side crown, said short shots conforming with the basket weave pattern, and means joining the bottom of the side crown to the brim to form the head size of the hat.

4. In a ventilated hat, the combination of a brim formed from a spirally laying felt strip and horseshoe shaped felt strips laying edge to edge within said spiral felt strip to form the desired head size, double yarn strands which cross-weave said felt strips of the brim in alternating manner so as to form a continuous basket weave pattern, said double yarn strands terminating in an encircling stitch at one edge of the brim and in a chain stitch at the other edge, a felt strip lying in spiral pattern and in desired shape and size for a side crown, double yarn strands which cross-weave the spiral laying felt strip of the side crown, said double yarn strands laying in alternating manner over and under the spiral laying felt strip so as to form a basket weave pattern therewith with an encircling stitch at one edge of the side crown and a chain stitch at the other, means joining the bottom of said side crown to the inner circumference of said brim to form the head size of the hat, and means closing said side crown at the end remote from said head size.

5. A moldable, porous, and flexible hat, which comprises a brim and crown formed from strip material, at least part of which lies edge to edge in spiral pattern, and double yarn strands joining and crossing said strips so as to form a basket weave pattern therewith.

6. A moldable, porous, and flexible hat, which comprises a brim and crown formed from strip material, at least part of which lies edge to edge, double yarn strands which cross and join said strips so as to form a basket weave pattern therewith, and pairs of double yarn strand short shots which form part of said basket weave pattern, both short shots of a pair being of substantially the same length and chain stitch joined to the next longer cross-weaving double yarn strand.

7. In an article of the character described, the combination of a brim and a crown, the brim being formed from strip material laying edge to edge in parallel manner, at least a portion of said strip material being continuous and lying in spiral pattern, double yarn strands joining said strip material into a unit and forming therewith a basket weave pattern brim, said double yarn strands being of greater number at the outer edge of said brim than at the inner edge thereof, the excess double yarn strands being anchored in pairs to adjacent double yarn strands which are longer, said brim having an encircling stitch outer edge and a chain stitch inner edge, the inner edge of the brim being joined to the lower edge of the crown.

8. In an article of the character described, the combination of a brim and a side crown, the side crown being formed of strip material laying edge to edge in parallel manner and in spiral pattern, double yarn strands extending from edge to edge of the side crown and laying alternately above and below the strip material to form a basket weave pattern therewith, said double yarn strands forming an encircling stitch lower edge and a chain stitch upper edge for said side crown, the encircling stitch edge of said side crown having a larger number of double yarn strands than the chain stitch edge thereof, said excess double yarn strands terminating in pairs at points intermediate of the edges of said side crown, the loop ends of said short pairs of double yarn strands receiving the next adjacent longer double yarn strand for anchoring thereto, the inner edge of the brim being joined to the lower edge of the side crown.

9. A hat which consists of a brim formed from strip felt at least a portion of which lies in spiral pattern, said brim being cross-woven with double yarn strands laid in basket weave pattern terminating with a series of encircling stitches at one edge of the brim and with a series of chain stitches at the other, the number of said double yarn strands at the outer edge of said brim being greater than the number at the inner edge thereof; a side crown formed from strip felt lying in spiral pattern and cross-woven with double yarn strands laid in basket weave pattern terminating with a series of encircling stitches at one edge of the side crown and with a series of chain stitches at the other, the number of said double yarn strands at one edge of said side crown being greater than the number at the other edge thereof; a top crown formed from strip felt with double yarn strands laid in basket weave pattern therewith and terminating at one end of the yarn strands crossing the felt strip material with a chain stitch and at the other end with an encircling stitch; the inner edge of the brim being joined to the bottom of the side crown to form the head size of the hat, and the top of the side crown being joined to the outer edge of the top crown to form the top of the hat.

10. In an article of manufacture, the combination which comprises felt strip material lying in a series of edge to edge courses at least part of which are in spiral pattern and forming, in desired pattern and size, an endless unit in the direction of the length of said strip material, double yarn strands lying alternately above and below said felt strips in basket weave pattern, all of said double yarn strands terminating at the larger edge of said endless unit in a series of encircling stitches, the other end of each of said double yarn strands terminating in chain stitches, part of which are continuous on the smaller edge of said endless unit while others are in the face of the endless unit intermediate of its edges.

11. In a method of forming an article of the character described, the steps which comprise laying strips edge to edge and at least part of same in spiral pattern until the desired size is attained, cross-weaving said strips with double yarn strands in manner forming an encircling stitch at the larger edge of said group of strips and a chain stitch at the other edge, cross-weaving said group of strips with a pair of spaced-apart double yarn strands starting at the encircling stitch edge so as to form in cooperation with said last-named course of double yarn strands a basket weave pattern, said pair of double yarn strands extending only part way across said group of strips and terminating in loop ends, then cross-weaving said group of strips with a double yarn strand starting at said encircling stitch edge in manner continuing the basket weave pattern, passing said last-named double yarn strand through the loop ends of said pair of spaced-apart double yarn strands to form a chain stitch therewith at that point intermediate of the edges of said group of strips, and intermediate of the cross-weaving length of said double yarn strand, and fastening the loop end of said double yarn strand by a chain stitch to another double yarn strand used for cross-weaving said group of strips.

12. The method of forming an article of the character described, which comprises the steps of laying strips edge to edge with at least part of same in spiral pattern until the desired size curved endless article is attained, cross-weaving said strips in basket weave pattern with double yarn strands in manner forming a series of encircling stitches at the larger edge of said article and chain stitches at the other end of each of said double yarn strands, part of said chain stitches being in series at the smaller edge of said article, inserting a pair of short shots of double yarn strands in said weaving, said short shots starting at the encircling stitch edge of the article and terminating with loop ends intermediate the edges thereof, then cross-weaving said strips with a longer double yarn strand and passing same through the loop ends of said pair of short shots so that each forms a chain stitch with it at that point, chain stitching the loop end of said longer double yarn strand to another double yarn strand, and continuing said weaving with pairs of said short shots chain stitched in place at intervals to longer chain stitched double yarn strands to produce a complete woven article of neat appearance and required form.

13. In a method of forming a hat or the like, the steps which comprise laying in desired pattern and size a series of courses of strip material edge to edge with at least part of said strip material laid in spiral pattern, the whole forming an endless unit assembly in the lengthwise direction of said strip material, cross-weaving said strips with double yarn strands in basket weave pattern producing a series of encircling stitches at the larger edge of said unit assembly and a lesser number of chain stitches at the smaller edge of said unit assembly, said cross-weaving comprising forming a loop in the cross-weaving yarn, and pulling said loop, starting at the larger edge of said unit assembly, in alternate under and over manner relative to said strip material to cross-weave same with a double yarn strand terminating at the inner edge of said endless unit assembly with a loop usable for forming a chain stitch at that point, forming another loop in said yarn at the larger edge of said unit assembly and pulling said loop in alternate under and over manner relative to said strip material and at the opposite faces thereof to form a basket weave pattern, said loop being carried only part way across the endless unit assembly, forming another loop in said yarn at the larger edge of said unit assembly and pulling said loop in alternate under and over manner relative to said strip material to continue the basket weave pattern, said loop also being carried only part way across the endless unit assembly and approximately the same distance across as the next previous double yarn strand, forming another loop in said yarn at the larger edge of said unit assembly and pulling said loop in alternate under and over manner relative to said strip material to continue the basket weave pattern, pulling said loop through the loop ends of the two previous cross-weaving courses of double yarn strands so that each forms a chain stitch with the double yarn strand passing through the loop ends thereof at a point intermediate of the two edges of said endless unit assembly, the loop end of said threaded double cross-weaving course extending further than the loops of the two courses already picked up and said loop in turn being picked up by a subsequent double yarn strand woven in basket weave pattern as before so as to form a chain stitch therewith, and continuing the cross-weaving with double yarn strands as before until the unit assembly is completely cross-woven with substantially radial double yarn strands and the spaces at the larger edge of said unit assembly filled in with short shots of double yarn strands, the loop ends of which form chain stitches in the face of the unit intermediate its edges, while the double yarn strands passing completely across the endless unit have their ends joined in a continuous chain stitch along the smaller edge thereof.

DELLA K. EXL.